(12) United States Patent
Heynen et al.

(10) Patent No.: US 8,441,439 B2
(45) Date of Patent: *May 14, 2013

(54) MODIFYING A VALUE BASED ON A USER'S DIRECTIONAL MOTIONS INDEPENDENT OF LOCATION OF INPUT RELATIVE TO A DISPLAY

(75) Inventors: Patrick Heynen, Redwood City, CA (US); Marian Goldeen, Three Rivers, CA (US); Egan Schultz, San Jose, CA (US); Dan Fish, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,699

(22) Filed: Sep. 9, 2011

(65) Prior Publication Data

US 2011/0316775 A1 Dec. 29, 2011

Related U.S. Application Data

(63) Continuation of application No. 11/787,060, filed on Apr. 13, 2007, now Pat. No. 8,040,319.

(51) Int. Cl.
*G09G 5/00* (2006.01)

(52) U.S. Cl.
USPC ............ 345/156; 345/157; 345/160; 715/856

(58) Field of Classification Search .................. 345/156, 345/157, 160; 715/723, 772, 773, 786, 787, 715/833, 856; 382/173

See application file for complete search history.

(56) References Cited

U.S. PATENT DOCUMENTS

| | | |
|---|---|---|
| 5,452,413 A | 9/1995 | Blades |
| 5,491,782 A | 2/1996 | King et al. |
| 5,559,301 A | 9/1996 | Bryan et al. |
| 5,751,285 A | 5/1998 | Kashiwagi et al. |
| 6,477,271 B1 | 11/2002 | Cooper et al. |
| 6,486,896 B1 | 11/2002 | Ubillos |
| 8,040,319 B2 * | 10/2011 | Heynen et al. ................ 345/156 |

OTHER PUBLICATIONS

EMAGIC Software, Logic Music and Audio Production Introduction Manual, available at http://www.uwm.edu/People/type/460/Logic6_OSXManualGettingStarted.pdf, undated, p. 26.

* cited by examiner

*Primary Examiner* — Kimnhung Nguyen
(74) *Attorney, Agent, or Firm* — Kilpatrick Townsend & Stockton LLP

(57) ABSTRACT

A method for changing a value displayed on a screen is provided. In response to receiving a user input indicating motion in a particular direction, changing the value independent of where the position of a cursor is on the screen. The value being changed may comprise of a series of segments, and each segment value can be changed individually. In addition, a different user input device that does not indicate motion in a particular direction may be used to change segment values and to select other segment values. Methods for automatically formatting a segmented values and calculating a base time rate based on two different frame rates are also provided.

28 Claims, 6 Drawing Sheets

MODIFYING A VALUE BASED ON A USER'S DIRECTIONAL MOTIONS INDEPENDENT OF LOCATION OF INPUT RELATIVE TO A DISPLAY

CROSS-REFERENCE TO RELATED APPLICATIONS; BENEFIT CLAIM

This application claims the benefit as a Continuation of U.S. patent application Ser. No. 11/787,060, filed Apr. 13, 2007 the entire contents of which are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 10/826,234, filed on Apr. 15, 2004, by Egan Schulz, Patrick Heynen, Charles Migos, and Jean-Pierre Mouilleseaux, entitled "User Interface Control for Changing a Parameter".

FIELD OF THE INVENTION

The present invention relates to enabling users to change values that are displayed on a screen.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users have long been able to view information displayed on a screen and to use input devices such as mice, keyboards, and track pads to modify the information displayed. Many user interfaces have been developed for displaying information, receiving input from the user, and displaying the modified information. For example, a user may use a mouse to double-click a word that is displayed on the screen to select it, use a keyboard to type in another word, and see that the original word has been replaced by the typed-in word. Another simple example is one where a user uses a mouse to drag an image that is displayed at one location on the screen to another location on the screen.

Some user interfaces allow users to quickly change a value, often a numeric value, and to clearly present how the value is being changed. In one approach using a traditional slider as the user interface component, a slider image is displayed on the screen, where a knob on the slider indicates the current numeric value and the slider contains two endpoints that define the range of possible values. The user may use a mouse or track pad to drag the knob along the slider, changing the current numeric value as the knob is dragged back and forth. This knob, however, cannot be dragged beyond the endpoints of the slider. The traditional slider allows the user to quickly and easily change the numeric value and clearly displays the updated value. However, this approach is limited because the two endpoints of the slider define the minimum and maximum bounds of what the value may be. Users who wish to change a value beyond the minimum and maximum bounds defined by a particular traditional slider are not able to do so under this approach.

In another approach described in U.S. patent application Ser. No. 10/826,234 ("User Interface Control for Changing a Parameter"), the traditional slider is replaced with a user interface component that does not impose inherent minimum and maximum bounds. In this approach, the user interface component does not display an image of a slider with a knob, but simply displays an image of the value itself, with no predefined endpoints. As with the traditional slider, the user can change the current value by selecting the value and using a mouse or track pad to make dragging motions. However, rather than dragging a knob across a slider that has endpoints, the dragging motions simply move the cursor across the screen. Because there are no endpoints, a user may continue to make a dragging motion to move the cursor across the screen beyond the display image of the control, thereby continuing to modify the value being displayed. This approach is more flexible than the traditional slider because there are no predefined bounds in the user interface component beyond which the user cannot modify the value. Physically, however, the user may still be limited by how far he can move the cursor across the screen. Once a user has moved the mouse such that the mouse cursor on the display screen has reached an edge of the screen, no further modification in the value can be effected. Under these circumstances, if the user desires further modification to the value, the user deselects the control (e.g. by releasing a mouse button), moves the cursor back to select the control again, and repeats the process. The need to reselect the control and repeat the process is especially pronounced when the value displayed on the screen is close to one of the edges of the screen, where a user has only a short distance to drag a mouse before the mouse cursor is stopped by a screen edge.

Another example of a user interface control is the jog shuttle implemented in Apple Inc.'s Final Cut Pro application. To use the jog shuttle, the user clicks on a wheel-like control and is able to change the value by continuously making a dragging motion across the jog shuttle.

The approaches just described allow a user to modify, via a sliding or dragging motion, a single value that is displayed as a single value. In certain applications, however, a single value may be displayed as a series of value segments. For example, applications for editing time-based media, such as video and audio data, may display time values as a series of value segments that correspond to hours, minutes, seconds, and frames. Significantly, even though the segmented values may be displayed as a series of segments, the segments collectively represent a single underlying value. For such segmented values, the approaches just described do not provide an expedient way to modify the values. Although Apple's Logic application provides a user interface for modifying segmented values, it does not provide for modification of the segmented values without regard to the position of a mouse cursor.

BRIEF DESCRIPTION OF THE DRAWINGS

Embodiments of the present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the embodiments of the invention discussed herein.

Functional Overview

Techniques as discussed herein, which allow users to change a value displayed on the screen without regard to limitations defined by the boundaries of the display screen. Accordingly, one mechanism allows a user to select a value to be modified and then "scrub"—repeatedly make dragging motions with a user input device in the same direction—the value to increase or decrease it. This mechanism processes the "scrubbing" motion without regard to a cursor position on the screen, so the user is not limited by the physical boundaries of the screen. This is advantageous because the user can "scrub" the value to modify it to any value desired, without regard to physical limitations imposed by the edges of a display screen and without having to de-select and re-select the value being modified.

Further mechanisms indicate when a value is ready to be "scrubbed" and in what direction the user is currently scrubbing, providing visual feedback to the user about what is happening. Another mechanism allows a user to change the value, within the same control that allows "scrubbing", without making a dragging motion (e.g., by using a keyboard). These mechanisms improve the ease-of-use of the user interface and clearly communicate to the user how the value is being modified.

Another mechanism allows "scrubbing" of values that are represented by series of segments. One example of such a value is a time value, which can be represented as a series of segments representing hours, minutes, seconds, and frames (e.g., HH:MM:SS;FF). According to this mechanism, a user can modify a segmented value by selecting and "scrubbing" any of the individual segments that collectively represent the value.

An additional mechanism allows a user to select one of several display formats for the value. A further mechanism calculates a time rate to align video data and audio data.

While numerous examples shall be presented herein involving the use of the "scrubbing" mechanism to adjust numerical values, this invention can be used to adjust a variety of information types. For example, the mechanisms described herein may be used to select a letter from an alphabetical list of letters, or to select a note from a series of musical notes. In this way, this invention serves as an improved user interface that allows a user to quickly change a piece of information displayed on a screen without bounds on what value the information can be.

Modifying a Value with Repeated Directional Motions

Figure 1:
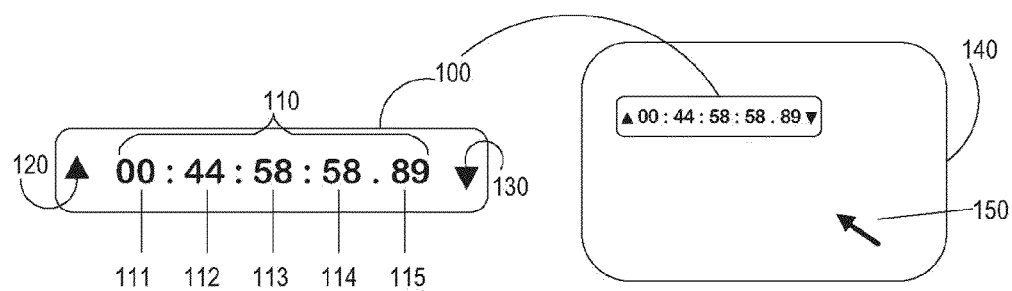
FIG. 1 is a graphical depiction of a value display that is displaying a segmented value.
Figure 2:
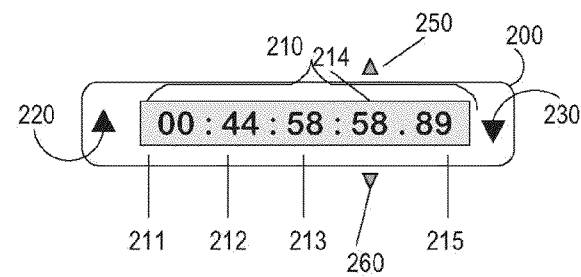
FIG. 2 is a graphical depiction of the selection of one segment of a segmented value in a value display.
Figure 3:
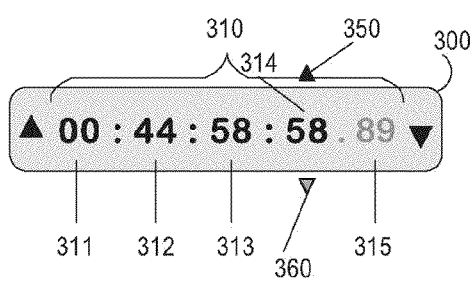
FIG. 3 is a graphical depiction of a value display and a segmented value while one segment value is being modified by a user.

FIGS. 1 through 3 are a series of graphical depictions of how a segmented value can be changed by a user's motion in a particular direction (e.g., a dragging motion). As shown in FIG. 1, value display 100 displays a value 110, a left-up arrow 120, and a right-down arrow 130. In FIG. 1, the value 110 is a segmented value and is segmented into five value segments 111, 112, 113, 114, and 115. Value display 100 can be displayed on a screen 140.

A user may select any one segment of value 110 with a user input device. In an embodiment, a user can use a mouse or track pad to move the cursor 150 on the screen 140 on to the segment that the user wishes to select. The display of value 110 can be modified to indicate which of the five segments has been selected by the user. For example, in FIG. 2, value display 200 contains a value 210, which has five value segments 211, 212, 213, 214, and 215. The value segment 214 is selected, and this is indicated by the arrows 250 and 260, which appear at the top and bottom of value segment 214 when it is selected.

Next, the user can place the selected value in a "scrubbing-target" state. In one embodiment, the value is placed in a scrubbing-target state by pressing a button on a user input device, such as a mouse or trackpad. As long as the key is held down, the value remains in the scrubbing-target state. The value ceases to be in the scrubbing-target state when the button is released. The pressing, holding down, and releasing of a button is merely one example of the user input actions that can be used to transition a value into and out of the scrubbing-target state.

While the value is in the scrubbing-target state, the user can dictate the amount of the desired increase or decrease of the selected value segment 214 by "scrubbing" it; that is, by making one or more motions with a mouse or similar user input device. The desired amount of modification to value segment 214 is based on the "scrubbing" motion and is independent of the position of the cursor 150. Therefore, in one embodiment, the cursor 150 ceases to be displayed on the screen 140 once a segment value has been placed in the scrubbing-target state. Ceasing to display the cursor 150 also prevents its image from obscuring the display of the segment value being displayed. Once the value is out of the scrubbing-target state, the cursor may be re-displayed. According to one embodiment, the cursor is re-displayed at the location at which the cursor resided at the time the value was put in the scrubbing-target state.

FIG. 3 depicts a value display 300 as it is being "scrubbed". The value 310 contains five value segments 311, 312, 313, 314, and 315. Value segment 314 has been placed in the scrubbing-target state by the user. After placing the segment in the scrubbing-target state, the user may start to "scrub" the value 310 by using a user input device to indicate a motion or a series of motions in a particular direction. For example, the user may drag to the right across a track pad repeatedly. In this example, such a motion indicates that the user desires to increase the value 310. At this point, visual indicators can be displayed to inform the user of the current progress of modification. For example, up arrow 350 and down arrow 360 adjacent to segment value 314 are displayed and the entire user interface component is highlighted to indicate that a "scrubbing" motion has begun on segment value 314. In this example, the up arrow 350 is displayed in bold to indicate that the user is using the input device to make an "upward" motion, thereby increasing the segment value 314. The display of segment value 314 is also continuously updated to reflect its current value.

Since the "scrubbing" motion does not depend on a cursor position, a user input device such as a scroll wheel on a mouse may also be used to change a value or segment value. Some track pads devices can also behave like scroll wheels when two fingers are dragged across them, and can be similarly used.

Finally, the "scrubbing" motion may be affected how sensitive the mouse input device is. Such mouse sensitive may be changed during a "scrubbing" session. For example, pressing the "SHIFT" key during a scrub may increase the mouse sensitivity, and pressing the "OPTION" key may decrease the mouse sensitivity.

Interactions Among Segment Values

In the embodiment illustrated in FIG. 3, the selected segment 314 and the segments that precede it—segments 311, 312, and 313—are displayed in bold to indicate that these are the segments that may be changed by the user "scrubbing" segment 314.

To illustrate how changing one segment may affect another segment, consider the example where the user starts to "scrub" to increase the segment value 314. As shown in FIG. 3, segment value 314 is a two-digit number, such as "58". As the user continues to increase segment value 314, it will eventually reach "59", the maximum value of a two-digit decimal number representing minutes. At this point, when the user further increases segment value 314, this increase can be carried over to the segment immediately preceding segment value 314 (i.e. segment value 313). That is, segment value 313 is incremented, and segment value 314 will roll back to "00". This carry-over mechanism can be applied for any two adjacent segment values. Consequently, higher-order segment values of the segment value currently being "scrubbed" may all change as a result of this scrubbing.

Significantly, the maximum value for value segments may vary from value segment to value segment, based on what the value segment represents. For example, value segments representing seconds and minutes may have a maximum value of 59. On the other hand, value segments representing hours may have a maximum value of 23. Whatever the maximum value for a value segment, user input that indicates an increase above that maximum value causes the value segment to be reset to zero, and the adjacent higher-order value segment to be incremented.

In FIG. 3, segment values 311, 312, and 313 are higher-order segment values relative to segment value 314. On the other hand, segment value 315, which comes after segment value 314 and is a lower-order segment value relative to segment value 314, is not affected by any increase or decrease in segment value 314. As a result, its display is grayed out to indicate that segment value 315 will not be affected by the scrubbing of the currently selected segment value.

In another embodiment, the segment values can be independent of one another such that changing one segment value will not affect any other segment value. Visual indicators may be displayed to indicate the segment values' independence. For example, a segment value which is currently being changed may be displayed in bold while no other segment value is displayed in bold.

In yet another embodiment, the segment value which is currently being modified may be pegged to its maximum or minimum value when such values are reached. For example, if a segment value that contains a two-digit decimal number reaches "99", the maximum value, any input from the user indicating a further increase can be ignored, pegging the segment value at "99". Similarly, if a segment value containing a two-digit decimal number reaches "00", any further input from the user indicating a further decrease can be ignored, pegging the segment value at "00", the minimum value. The maximum and minimum values for any segment value can also be defined by the software employing this user interface.

In another embodiment, lower-order segment values—the segment values to the right of the segment value being "scrubbed"—may also change in response to the "scrubbing".

Locking in an Axis for Repeated Directional Motions

Users may wish to "scrub" either vertically in up-and-down motions or horizontally in left-and-right motions. In an embodiment, a user's directional motions along both the vertical axis and the horizontal axis can both be accepted as user input indicating an increase or decrease in value (typically, a vertical up motion and a horizontal right motion indicates an increase; a vertical down motion and a horizontal left motion indicates a decrease). This is advantageous because it provides the user with more flexibility in using the interface.

Once a user starts to "scrub" along one axis, however, it may be desirable to consider, for the purposes of changing the value, only the component of the user's motion that is along that axis for the remaining duration of the "scrubbing" session. In other words, when a user starts a scrubbing session with a primarily up or down motion, then only the vertical component of the user's input is considered during the scrubbing session. On the other hand, when a user starts a scrubbing session with a primarily left or right motion, then only the horizontal component of the user's input is considered during the scrubbing session. Advantageously, this locking-in of the axis prevents the selected segment value from being changed by accidental or spurious motions by the user. One method for accomplishing this is as follows:

After a segment value has been selected, the first user directional motion is analyzed to determine an axis of motion. This first motion is broken down into its horizontal and vertical components. If the magnitude of the vertical component is greater than the magnitude of the horizontal component, then the primary axis of motion is the vertical axis, and the magnitude of the vertical component is used to determine the amount of increase or decrease to the segment value. If the magnitude of the horizontal component is greater than the magnitude of the vertical axis, then the primary axis of motion is the horizontal axis, and the magnitude of the horizontal component is used to determine the amount of increase or decrease to the segment value.

Once a primary axis of motion has been determined, the value is changed based on the magnitude of the component of subsequent user directional motions that is along that axis. That is, if the axis of motion is the vertical axis, then only the magnitude of the vertical component of any subsequent user directional motion is used to determine the amount of increase or decrease to the segment value. Similarly, if the axis of motion is the horizontal axis, then only the magnitude of the horizontal component of any subsequent user directional motion is used to determine the amount of increase or decrease to the segment value.

As illustrated in FIG. 3, up arrow 350 and down arrow 360 can be displayed to indicate that a "scrubbing" motion has begun. Furthermore, which of the arrows 350 and 360 is in bold indicates whether the user is currently increasing or decreasing the selected segment value. These indications are applicable whether the axis of motion is the vertical axis or the horizontal axis.

Figure 4:
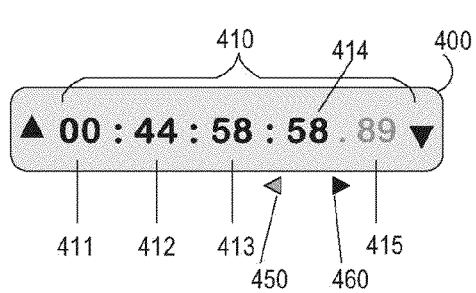
FIG. 4 is another graphical depiction of a value display and a segmented value while one segment value is being modified by a user.

Additionally, a different set of arrows can be displayed to indicate the axis of motion. FIG. 4 depicts a value display 400 as it is being "scrubbed". The value 410 contains five value segments 411, 412, 413, 414, and 415. In FIG. 4, the arrows 450 and 460 also indicate that the selected value segment 414 is being "scrubbed" and the bold arrow 450 indicates that the user is currently increasing the selected segment value. Furthermore, the arrows 450 and 460 point to the left and right, indicating that the current axis of motion is the horizontal axis and that vertical motion will be ignored by the user interface.

Advantageously, by displaying either vertical arrows like 350 and 360 or horizontal arrows like 450 and 460, the user is visually informed as to along which axis should future motions be directed to affect a change in the selected segment value.

In one embodiment, a first user directional motion, which is analyzed to determine an axis of motion, is not used until a length of hystereis has passed. Allowing a hysteresis, or a minimum drag distance, to occur before analyzing the first user directional motion ensures that small, spurious motions would not determine the axis of motion. For example, the hysteresis can be six pixels so that the first direction (horizontal or vertical) to reach six pixels of movement will be the axis of motion. A default direction may be used as the axis of motion if both the horizontal and vertical directions incur six pixels of movement at the same time.

A user may also click on the arrows on the left and right ends of a value display to change the entire value. As depicted in FIG. 1, the value display 100 contains a left-up arrow 120 and a right-down arrow 130. The user can click on the left-up arrow 120 to increase the entire value 110. Single clicks will increment the entire value 110 for a set amount at a time. This is called "stepping". Additionally, a sustained click-and-hold on the left-up arrow 120 will result in the entire value 110 changing continuously at a rate preset by the software. Similarly, the same clicking motions can be used on the right-down arrow 130 to decrease the entire value 110.

Finally, a user may click on the left and right ends of a value display to change a single segment, if that segment has already been selected. As depicted in FIG. 2, the value display 200 contains a left-up arrow 220 and a right down-arrow 230. Also, the value segment 214 in value 210 is accompanied by arrows 250 and 260, indicating that this segment has been selected by a user. Here, the user can click on the left-up arrow 220 to increase the segment value 214. Single clicks will increment the segment value 214 for a set amount at a time (i.e. "stepping" segment value 214). Additionally, a sustained click-and-hold on the left-up arrow 220 will result in the segment value 214 changing continuously at a rate preset by the software. Similarly, the same clicking motions can be used on the right-down arrow 230 to decrease segment value 214.

Custom Segmented Values and Non-Segmented Values

Although the embodiments illustrated so far allow users to modify segmented values such as time values, the present invention is neither limited to segmented time values nor to segmented values in general.

Figure 5:
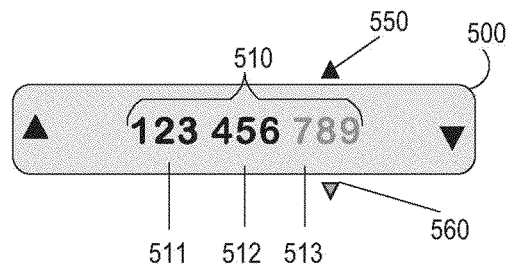
FIG. 5 is a graphical depiction of a value display that is displaying a segmented value that is segmented differently than the segmented value in FIGS. 1-4.

In an embodiment, a value may be segmented according to the needs of a particular software application. For example, FIG. 5 illustrates a value display 500 and a value 510, where value 510 is a nine-digit decimal number. In this example, value 510 has been divided into three segments 511, 512, and 513, each with three digits, representing the millions, thousands, and ones of value 510, respectively. Currently, segment value 512 is being "scrubbed" in a decreasing direction, and segment value 511 may change as a result of the modification of segment value 512.

In another embodiment, a user may change a single, non-segmented value in the same manner as described above for modifying a segment value, inputting a series of directional motions independent of any cursor position.

In yet another embodiment, a user may change non-segmented and segmented values which are not numbers. For example, a value being changed may be one in a series of musical notes (e.g., C, C-sharp, D, D-sharp, . . . etc.).

Recovering the Cursor

As mentioned above, in one embodiment, the cursor (e.g. cursor 150 in FIG. 1) disappears once a user begins to modify a segmented value with a "scrubbing" motion. In an embodiment, the cursor reappears after the termination of a series of "scrubbing" motions at the same position on the screen as its position immediately before the start of the "scrubbing" motions. The cursor can reappear after a certain amount of time has elapsed after the last "scrubbing" motion was received from the user.

Having the cursor reappear where the cursor was at the start of the scrubbing is often preferable to other approaches, where a user uses a dragging motion to move the cursor, movement of the cursor modifies a value, and the amount of modification depends on the position of the cursor. In such approaches, the cursor will often be located at a position far away from its starting position at the end of a dragging motion, making it difficult for a user to find the cursor on the screen. In contrast, having the cursor reappear at that position that it was at right before the "scrubbing" motion enables the user to quickly and easily relocate the cursor and continue on with the next task. Accordingly to Fitt's Law, the time to acquire a target with the mouse is directly proportional to its distance from the current position, and inversely proportional to its size. Hence, it is especially advantageous when the user wishes to "scrub" more than one segment value, because the target size for the next segment value that the user wishes to "scrub" may be very small, and in previous approaches, the mouse may have moved a large distance away as a result of sustained dragging to change a previous segment value.

Modifying a Segment Value without Repeated Directional Motions

Users may additionally wish to modify a segmented value on a per segment basis without inputting directional motions. For example, a user may wish to modify a segmented value on a per segment basis by pressing the keys on a keyboard instead of using a mouse. One embodiment provides mechanisms to perform this type of modification, as described in FIG. 1 and FIGS. 6 through 11.

As discussed above, FIG. 1 depicts a value display 100, which displays a value 110, a left arrow 120, and a right arrow 130. In FIG. 1, the value 110 is a segmented value and is segmented into five value segments 111, 112, 113, 114, and 115. As it is depicted in FIG. 1, neither value 110 nor any of its five value segments has been selected by the user.

Figure 6:
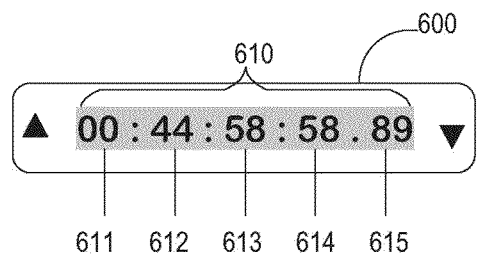
FIG. 6 is a graphical depiction of a value display and a segmented value which has been selected.

One approach for modifying the value 110 is to receive user input that modifies the entire value 110. In this approach, a user can select the entire value 110 by clicking anywhere on 110. FIG. 6 illustrates what the value display 600 looks like after using selection of an entire value. Value display 600 displays a value 610, which contains segments 611, 612, 613, 614, and 615. The value 610 is highlighted, indicating that the entire value 610 has been selected by the user. The user can now press a keystroke (e.g., a "RETURN" key on a keyboard) to edit the entire value 610.

Figure 7:
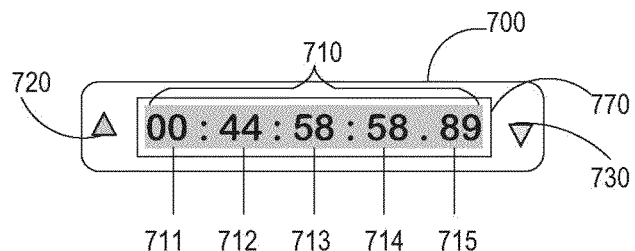
FIG. 7 is a graphical depiction of a value display and a segmented value which has been selected and is ready for editing.
Figure 8:
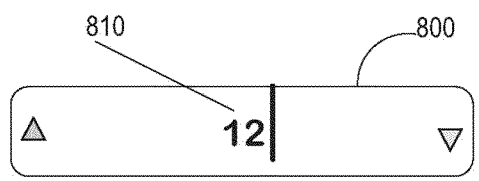
FIG. 8 is a graphical depiction of a value display and a segmented value being entered into the value display.

FIG. 7 depicts a value display after the entire value is ready to be edited. The entire value 710 is highlighted, the left and right arrows 720 and 730 are grayed out, and a text box 770 appears, indicating that the entire value 710 can now be edited. At this point, the user can enter in a new value to modify the entire value 710. FIG. 8 depicts a value display 800 while the user is typing in a new value 810. Additionally, once the entire value has been selected as depicted in FIG. 6, the user can immediately start entering a new value without first pressing a keystroke to achieve the display in FIG. 7.

Figure 9:
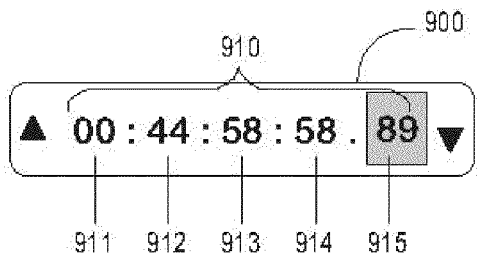
FIG. 9 is a graphical depiction of a value display and a segmented value where the rightmost segment value has been selected.
Figure 10:
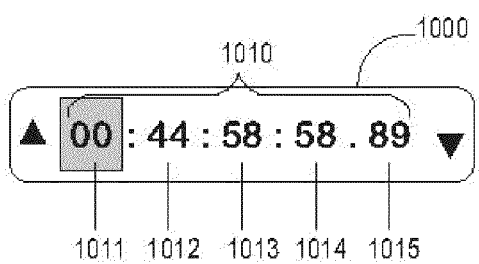
FIG. 10 is a graphical depiction of a value display and a segmented value where the leftmost segment value has been selected.
Figure 11:
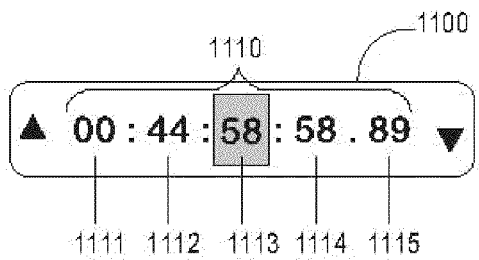
FIG. 11 is a graphical depiction of a value display and a segmented value where the default segment value has been selected.

It is advantageous to supplement the approach just described with additional mechanisms for allowing a user to modify a value on a per segment basis, providing the user with specific control over a segmented value. After an entire value has been selected, as depicted in FIG. 6, the user may communicate a desire to change values on a per segment basis through another input. Which specific segment will be selected can depend on the user input. For example, the user can click on any one of the five segment values 611, 612, 613, 614, and 615 to select that segment. Additionally, pressing a right arrow key can select the rightmost segment value 615, and pressing a left arrow key can select the leftmost segment value 611. Furthermore, yet another type of input (e.g., moving the scroll wheel on a mouse) can select the default segment value, as predetermined by the software. FIG. 9 depicts a value display 900 where the rightmost segment value 915 of value 910 has been selected. FIG. 10 depicts a value display 1000 where the leftmost segment value 1015 of value 1010 has been selected. Additionally, a default segment value may be set such that it will be selected if a user presses a key that does not select a specific segment. For example, in FIG. 11, the default segment value of value display 1110 is segment value 1115 and it is the currently selected segment value.

Once a specific segment value has been selected, the user can modify the segment value without indicating physical directional motion through a user input device. First, the user can modify the selected segment value by pressing, for example, the up and down arrow keys on a keyboard. Once the user has started modifying the selected segment value, a value display can visually display the progress of the modification of the segment value (see FIGS. 3 and 4 above). Furthermore, as a user increases the selected segment value to more than its maximum value or decreases the selected segment value to less than its minimum value, segment values preceding the selected segment value can change accordingly.

A user can also modify the selected segment value by directly entering in the desired value for the selected segment value. Finally, a user can select another segment value with a keystroke. For example, pressing the "TAB" key on a keyboard can select the segment value immediately to the right of the current selected segment value.

States and Transitions of an Example Embodiment

Figure 13:
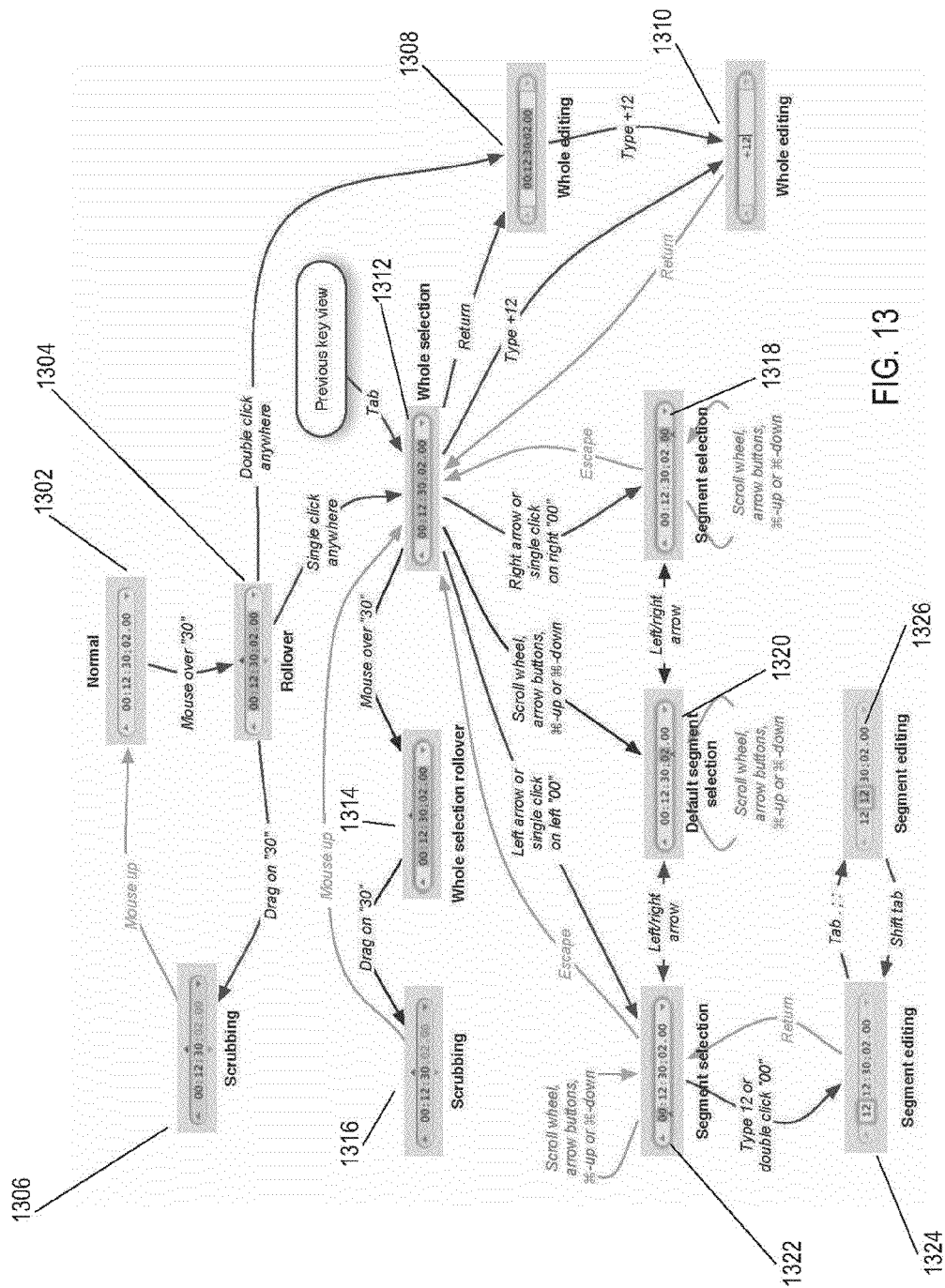
FIG. 13 is a graphical depiction of states and state transitions supported by a user interface component designed according to an embodiment of the invention.

Referring to FIG. 13, it is a block diagram that illustrates the states, and state transitions, supported by a user interface component that is designed according to an embodiment of the invention. Specifically, state 1302 is a state in which neither the entire value nor any of the segment values in the user interface component has been selected. When a user moves a mouse device over a particular segment, state 1302 transitions to state 1304, where the particular segment is selected. State 1304 transitions to state 1306 if a user clicks a mouse button, holds it down, and makes a dragging motion on the selected segment. This commences the "scrubbing" of the selected segment. At this point, if the user ceases to hold down the mouse button, "scrubbing" will also stop, and state 1306 transitions back to state 1302.

From state 1304, the user can alternatively double-click anywhere in the user interface component to transition to state 1308. In state 1308, the entire value is selected for editing. At this point, typing in a value from a device such as a keyboard will result in a transition to state 1310, where the typed-in value replacing the original value.

Also from state 1304, a single-click in the user interface component will result in a transition to state 1312. In state 1312, a user can also start typing to reach state 1310, where the typed-in value will replace the original value.

In addition, in state 1312, if a user moves a mouse device over a particular segment, state 1312 transitions to state 1314, where the particular segment is selected. State 1314 transitions to state 1316 if a user clicks a mouse button, holds it down, and makes a dragging motion on the selected segment. This commences the "scrubbing" of the selected segment. At this point, if the user ceases to hold down the mouse button, "scrubbing" will also stop, and state 1306 transitions back to state 1312. Significantly, states 1314 and 1316 and different from states 1304 and 1306 in that the whole value and a particular segment are selected in states 1314 and 1316, while only a particular segment is selected in states 1304 and 1306. Hence, when "scrubbing" ceases in state 1316, a transition is made back to state 1312, where the whole value remains selected.

Three more transitions can be made from state 1312. A press of the right arrow key on a keyboard or a single click on the rightmost segment in the user interface component will result in a transition to state 1318, where the rightmost segment is selected. A press of the left arrow key on a keyboard or a single click on the leftmost segment in the user interface component will result in a transition to state 1322, where the leftmost segment is selected. A press of the "ESCAPE" key on a keyboard in either state 1318 or 1322 will result in a transition back to state 1312. Finally, from state 1312, a scrolling of the scroll wheel on a mouse, a clicking on either a left-up arrow or right-down arrow on the user interface component (such as the left-up arrow 120 or the right-down arrow 130 in FIG. 1), or a press of the up or down arrow keys along with a press of the command key ("⌘") will result in a transition to state 1320, where a default segment is selected, and increase or decrease the value of that segment according to the direction of rotation of the scroll wheel or which keyboard arrow key is pressed or which of left-up arrow 120 or right-down arrow 130 is clicked. The default segment can be set to a particular segment by an application utilizing this user interface component. In this example, the default segment is the fourth segment from the left.

In state 1318, where the rightmost segment is selected, a press of the right-arrow key on a keyboard is ignored. However, a press of the left-arrow key on a keyboard will result in transitioning from state 1318 to a state where the segment immediately to the left of the currently selected segment is selected. Similarly, in state 1322, where the leftmost segment is selected, a press of the left-arrow key on a keyboard is ignored, while a press of the right-arrow key will result in transitioning from state 1322 to a state where the segment immediately to the right of the currently selected segment is selected. In a state where the selected segment is neither the rightmost segment nor the leftmost segment, such as state 1322, a press of the right arrow key on a keyboard will result in transitioning to a state where the segment immediately to the right of the currently selected segment is selected, and a press of the left arrow key on a keyboard will result in transitioning to a state where the segment immediately to the left of the currently selected segment is selected.

In states 1318, 1320, and 1322, the value of the selected segment can be changed by using a scroll wheel on a mouse, a clicking on either a left-up arrow or right-down arrow on the user interface component (such as the left-up arrow 120 or the right-down arrow 130 in FIG. 1), or a press of the up or down arrow keys along with a press of the command key ("⌘").

Finally, in states 1318, 1320, and 1322, a segment editing state can be entered for editing values on a segment-by-segment basis. For example, in state 1322, if a user begins typing or double-clicks on the selected segment, state 1322 will transition to state 1324, where the selected segment value accepts text input of a new value to replace its previous value. While in state 1324, pressing a "TAB" key on a keyboard will result in a transition to a state where the segment immediately to the right of the current selected segment is selected and is ready to accept text input of a new value. An example of this is state 1326. Similarly, pressing a "TAB" key along with a "SHIFT" key will result in a transition to a state where the segment immediately to the left of the current selected segment is selected and is ready to accept text input of a new value. For example, this will result in a transition from state 1326 back to state 1324. Pressing a "RETURN" key while in state 1324 will result in a transition back to state 1322.

FIG. 13 is an illustrative example of an embodiment in this invention. However, embodiments of this invention are not restricted in any sense to the specific implementation utilized in FIG. 13.

Dynamically Formatting a Display of a Segmented Value

When a segmented value is displayed on a screen, it is advantageous to enable the user to select the format in which the segmented value is displayed. As an example, consider the display of a non-segmented value, such as the number 10. The number 10 can be displayed in several different formats. In the binary format, the number 10 is "1010"; in the hexadecimal format, the number 10 is "A". Similarly, a segmented value such as a time code value can be represented in different formats. For example, the time code value "01:05:00;02" in the SMPTE (Society of Motion Picture and Television Engineers) format means 1 hour, 5 minutes, 0 seconds, 2 frames. This amount of time may be presented as a different segmented value in other time code formats such as MIDI (Musical Instrumental Digital Interface), HMS (hours, minutes, and seconds), and Video Frames (a straight count of frames up to the current frame). The translation from one time code format to another, however, is not as straightforward as the translation from a decimal to a binary number. When converting from one format of a segmented value, such as a time code value, to another format of a segmented value, the number of segments and the range of numbers in each segment may change. As a result, it is advantageous to automatically translate between (a) the underlying value and (b) the segment values that collectively represent the underlying value, when the underlying value is displayed in a user-selected segmented format.

Figure 12:
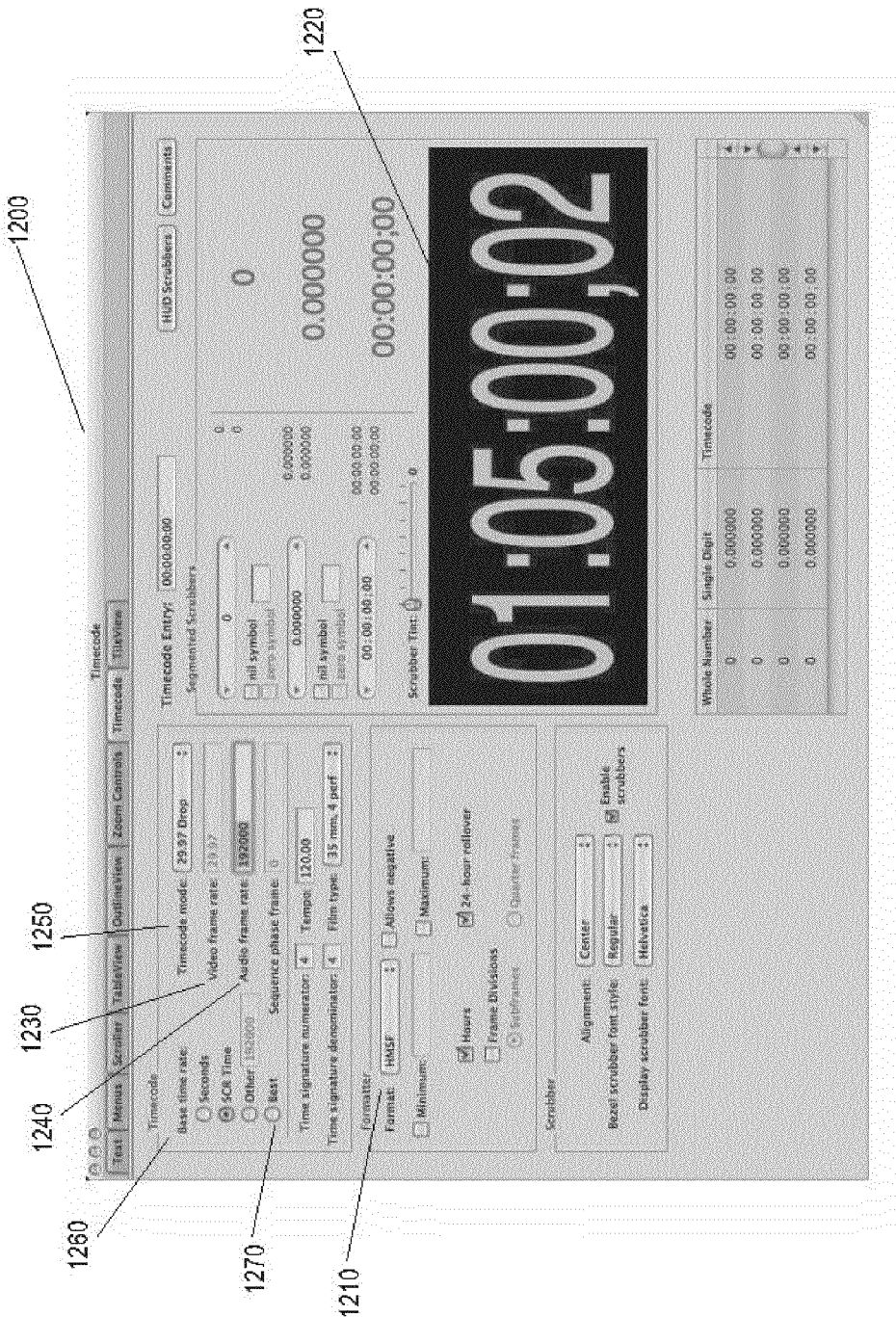
FIG. 12 is a graphical depiction of a user interface with various value displays, a section for selecting a display format, and a section for selecting a base time rate.

FIG. 12 depicts a user interface which contains a number of value displays that can be "scrubbed" and a format-select display. Format selector 1210 presents the user with a drop-down menu, with which the user can select the time code format desired. Main time code display 1220 is automatically updated to display the current underlying time code value in the format specified by the user.

In an embodiment, a time code object may store the current underlying time code value and a user interface component may generate the time code display 1220. A formatter component may receive a selected format from the user via format selector 1210 and relay this information to the time code object. The time code object may then perform the conversion from the current underlying time code value to the format selected by the user, and communicate the segment values in this format to the formatter component. The formatter component may then relay information about the display of the value, such as the width of each segment, to the user interface component. The user interface component may then update the time code display 1220 to display the underlying time code value in the format selected by the user.

Calculating a Time Rate to Align Audio and Video Data

In a media editing application, where video and audio data are edited together, it is advantageous to provide a mechanism to align video and audio data at different frame rates together. This alignment can be accomplished by calculating a base time rate that, when used in conjunction with the video and audio data, do not produce any rounding errors.

To further illustrate this problem, consider a simple example where video data is received which contains 3 frames per second and that audio data is received which contains 1.2 frames per second. In processing these two data, the media editing application employs a base time rate, in units of ticks per second, that sets the time points at which the video and audio data are aligned. Suppose an arbitrary base time rate is selected, such as 4 ticks per second. Since neither 3 nor 1.2 divides evenly into 4, a rounding error is incurred every time the video and audio data are aligned. This may be tolerable over a short period of time, but the accumulation of rounding errors will be noticeable for media with long lengths of time, such as a long feature film. In this example, a base time rate of 6 ticks per second will eliminate any rounding errors because both 3 and 1.2 divide evenly into 6.

It is advantageous to automatically generate a base time rate that, based on a video frame rate and an audio frame rate, does not generate any rounding errors.

In FIG. 12, video frame rate box 1220 and audio frame box 1230 allow a user to input the frame rates for the video and audio data to be edited. A time rate selection area 1240 gives users several choices in which time rate to use. If a user chooses "Best" time rate 1250, a base time rate is automatically calculated and used to achieve alignment of the audio and video data without rounding errors. In one example, a video frame rate is 24 frames per second and an audio frame rate is 44,100 frames per second. A time rate that would align the video data and audio data without rounding errors is one that is the least common multiple of the video frame rate and the audio frame rate (here, the least common multiple is 88,200) This time rate of 88,200 can be automatically generated. In this example, a time rate of 88,200 ticks per second would yield 3,675 ticks for a video frame and 2 ticks for an audio frame. In another example, each video frame is divided into 80 sub-frames. To align video data and audio data on the sub-frame level, a time rate which is the least common multiple of the video frame rate, number of sub-frames, and the audio frame rate is calculated. In this example, this time rate is 1,411,200 ticks per second. In one embodiment, Euclid's algorithm is used to determine the base time rate that achieves alignment of the audio and video data without rounding errors.

Hardware Overview

Figure 14:
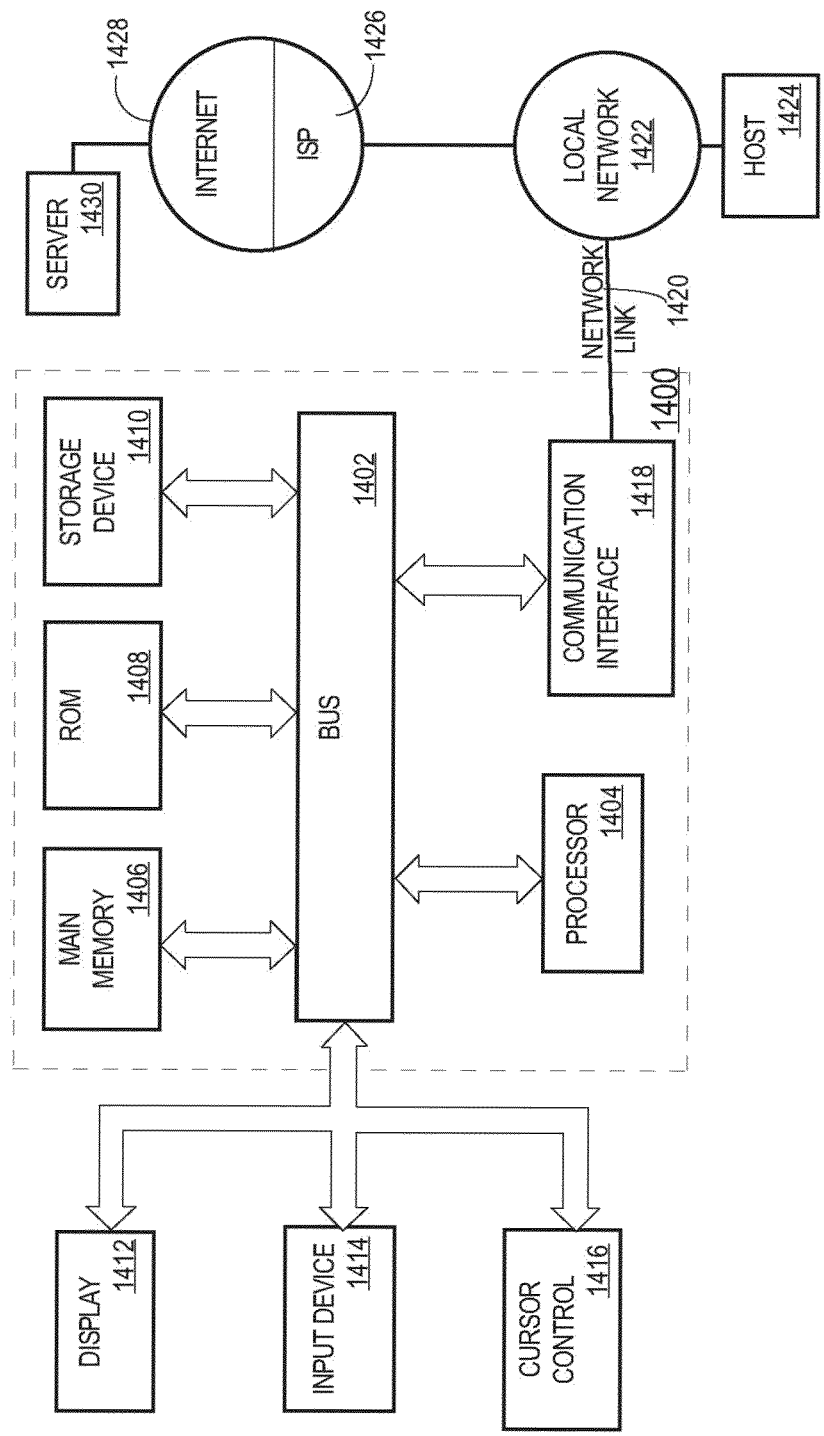
FIG. 14 is a block diagram of a computer system upon which embodiments of the invention may be implemented.

FIG. 14 is a block diagram that illustrates a computer system 1400 upon which an embodiment of the invention may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for implementing the techniques described herein. According to one embodiment of the invention, those techniques are performed by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1400, various machine-readable media are involved, for example, in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In this manner, computer system 1400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for changing a value, the method comprising:
   causing a depiction of the value to be displayed on a screen;
   receiving input that indicates user motion in a particular direction; and
   after receiving the input has begun, changing the value based on how much motion in the particular direction is indicated by the input, without respect to where the input is received relative to the screen.

2. The method of claim 1, wherein the input corresponds to a series of distinct motions.

3. The method of claim 2, wherein:
   the series of distinct motions includes at least:
   a first motion that is substantially in a first direction that is opposite a second direction, and
   a subsequent motion that is substantially in the first direction; and
   the subsequent motion begins at a location that is in the second direction relative to where the first motion ended.

4. The method of claim 2, wherein:
   the series of distinct motions includes at least a first motion and at least one subsequent motion;
   detecting a second distance along a vertical axis of the first motion;
   if the first distance is larger than the second distance, then modifying the value based only on the first distance and distances along a horizontal axis of any subsequent motions; and
   if the second distance is larger than the first distance, then modifying the value based only on the second distance and distances along a vertical axis of any subsequent motions.

5. The method of claim 1, wherein:
   the input is second input received after first input; and
   the method further comprises:
   causing a cursor to be displayed on the screen;
   in response to the first input, selecting the value and ceasing to display the cursor; and
   in response to third input received after the second input, causing the cursor to be displayed on the screen.

6. The method of claim 5, further comprising:
   in response to the first input, causing direction indicators adjacent to the depiction of the value to be displayed.

7. The method of claim 6, further comprising:
   in response to the second input, changing the visual appearance of one or more of the direction indicators to indicate the direction of the motion.

8. The method of claim 1, wherein:
   the value corresponds to a value segment of a base value; and
   the base value is depicted as a series of value segments on the screen.

9. The method of claim 8, wherein the value is changed based on said motion without affecting any other value segments of the base value.

10. The method of claim 8, further comprising:
    changing one or more other value segments of the base value in response to a change in the value.

11. The method of claim 8, wherein:
    said motion in the particular direction indicates an increase;
    said value is equal to a maximum value for said value segment; and
    the method further comprises, in response to detecting said motion, changing said value from said maximum value to a minimum value for said value segment.

12. The method of claim 11, further comprising, in response to detecting said motion, incrementing a value of a value segment that precedes the value segment.

13. The method of claim 8, wherein:
    said motion in a particular direction indicates a decrease; and
    said value is equal to a minimum value for said value segment;
    the method further comprises, in response to detecting said motion, changing said value from said minimum value to a maximum value for said value segment.

14. The method of claim 13, wherein the method further comprises, in response to detecting said motion, decrementing a value of a value segment that precedes said value segment.

15. One or more non-transitory storage media storing instructions for changing a value, wherein the instructions, when executed by one or more processors, cause:
    causing a depiction of the value to be displayed on a screen;
    receiving input that indicates user motion in a particular direction; and
    after receiving the input has begun, changing the value based on how much motion in the particular direction is indicated by the input, without respect to where the input is received relative to the screen.

16. The one or more non-transitory storage media of claim 15, wherein the input corresponds to a series of distinct motions.

17. The one or more non-transitory storage media of claim 16, wherein:
the series of distinct motions includes at least:
a first motion that is substantially in a first direction that is opposite a second direction, and
a subsequent motion that is substantially in the first direction; and
the subsequent motion begins at a location that is in the second direction relative to where the first motion ended.

18. The one or more non-transitory storage media of claim 16, wherein:
the series of distinct motions includes at least a first motion and at least one subsequent motion;
detecting a first distance along a horizontal axis of the first motion;
detecting a second distance along a vertical axis of the first motion;
if the first distance is larger than the second distance, then modifying the value based only on the first distance and distances along a horizontal axis of any subsequent motions; and
if the second distance is larger than the first distance, then modifying the value based only on the second distance and distances along a vertical axis of any subsequent motions.

19. The one or more non-transitory storage media of claim 15, wherein:
the input is second input received after first input; and
the instructions, when executed by one or more processors, further cause:
causing a cursor to be displayed on the screen;
in response to the first input, selecting the value and ceasing to display the cursor; and
in response to third input received after the second input, causing the cursor to be displayed on the screen.

20. The one or more non-transitory storage media of claim 19, wherein the instructions, when executed by the one or more processors, further cause:
in response to the first input, causing direction indicators adjacent to the depiction of the value to be displayed.

21. The one or more non-transitory storage media of claim 20, wherein the instructions, when executed by the one or more processors, further cause:
in response to the second input, changing the visual appearance of one or more of the direction indicators to indicate the direction of the motion.

22. The one or more non-transitory storage media of claim 15, wherein:
the value corresponds to a value segment of a base value; and
the base value is depicted as a series of value segments on the screen.

23. The one or more non-transitory storage media of claim 22, wherein the value is changed based on said motion without affecting any other value segments of the base value.

24. The one or more non-transitory storage media of claim 22, wherein the instructions, when executed by the one or more processors, further cause:
changing one or more other value segments of the base value in response to a change in the value.

25. The one or more non-transitory storage media of claim 22, wherein:
said motion in the particular direction indicates an increase;
said value is equal to a maximum value for said value segment; and
the instructions, when executed by the one or more processors, further cause, in response to detecting said motion, changing said value from said maximum value to a minimum value for said value segment.

26. The one or more non-transitory storage media of claim 25, wherein the instructions, when executed by the one or more processors, further cause, in response to detecting said motion, incrementing a value of a value segment that precedes the value segment.

27. The one or more non-transitory storage media of claim 15, wherein:
said motion in a particular direction indicates a decrease; and
said value is equal to a minimum value for said value segment;
the method further comprises, in response to detecting said motion, changing said value from said minimum value to a maximum value for said value segment.

28. The one or more non-transitory storage media of claim 27, wherein the instructions, when executed by the one or more processors, further cause, in response to detecting said motion, decrementing a value of a value segment that precedes said value segment.

* * * * *